(12) United States Patent
Hu et al.

(10) Patent No.: US 10,675,991 B2
(45) Date of Patent: Jun. 9, 2020

(54) METHODS FOR RECONFIGURABLE BATTERY CHARGER CONTROL

(71) Applicant: GM GLOBAL TECHNOLOGY OPERATIONS LLC, Detroit, MI (US)

(72) Inventors: Yiran Hu, Shelby Township, MI (US); Shifang Li, Shelby Township, MI (US); Lei Hao, Troy, MI (US); Chandra S. Namuduri, Troy, MI (US); Thomas W. Nehl, Shelby Township, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 173 days.

(21) Appl. No.: 15/987,975

(22) Filed: May 24, 2018

(65) Prior Publication Data
US 2019/0359067 A1   Nov. 28, 2019

(51) Int. Cl.
*B60L 58/22* (2019.01)
*H02J 7/00* (2006.01)
*B60L 53/10* (2019.01)

(52) U.S. Cl.
CPC ............. *B60L 58/22* (2019.02); *B60L 53/11* (2019.02); *H02J 7/0019* (2013.01)

(58) Field of Classification Search
CPC .................................. B60L 58/19; B60L 58/22; B60L 53/11; H02J 7/0014; H02J 7/0019
USPC ........ 320/104, 112, 117, 119, 122, 134, 136, 320/163
See application file for complete search history.

(56) References Cited

U.S. PATENT DOCUMENTS

2013/0335026 A1* 12/2013 Reynolds ............ H02J 7/0016
                                                                            320/112
2017/0163060 A1*  6/2017 Zheng ................. H02J 7/0019

* cited by examiner

*Primary Examiner* — Edward Tso
*Assistant Examiner* — Aaron Piggush
(74) *Attorney, Agent, or Firm* — Reising Ethington P.C.; Sten Schuler

(57) ABSTRACT

Methods of charging a vehicle battery pack are disclosed. Example methods may include determining a voltage imbalance between at least two parallel strings of a battery pack exceeds a threshold magnitude. Methods may further include electrically reducing the voltage imbalance between the at least two parallel strings using a series circuit including a first group of one or more of the battery cells of a first one of the parallel strings, and reconnecting the parallel strings in an electrical circuit in parallel to each other, in which configuration the strings of the battery pack may supply power to the vehicle.

10 Claims, 6 Drawing Sheets

METHODS FOR RECONFIGURABLE BATTERY CHARGER CONTROL

INTRODUCTION

Electric and hybrid drivetrain vehicles typically rely at least in part upon power supplied by a rechargeable battery. Batteries may include a number of rechargeable cells or packs for supplying electrical potential to the vehicle. Each pack may have one or more, and in most cases a very large number, of individual cells.

Vehicle battery packs may at times have an imbalance in voltage potential between groups of cells. Imbalances in potential between may affect performance of the vehicle battery and prevent usage of the groups of cells in a parallel electrical circuit.

Accordingly, there is a need for an improved method for recharging a vehicle battery that addresses the above problems.

SUMMARY

Example illustrations herein are directed to a method of charging a vehicle battery pack having a plurality of parallel strings, where each of the parallel strings comprising one or more battery cells. In at least some implementations, a method includes determining that a voltage imbalance between at least two of the parallel strings exceeds a threshold magnitude, and in response to that determination, electrically reducing the voltage imbalance between the at least two parallel strings using a series circuit including a first group of one or more of the battery cells of a first one of the parallel strings. The method may further include reconnecting the parallel strings in an electrical circuit in parallel to each other, the parallel strings thereby configured to supply power to the vehicle.

In some examples, a method may include determining that the first group of the cells has a lower voltage potential than a second group of one or more of the cells of a second one of the parallel strings.

A voltage imbalance between parallel strings may be electrically reduced in several different ways. In one example, a method of electrically reducing a voltage imbalance includes connecting the first group of the cells in series with an external power supply, such that the voltage imbalance is electrically reduced by increasing the voltage potential of the first group of the cells. In another approach, the second group of the cells is connected in series with an electrical load, such that the voltage imbalance is electrically reduced by reducing the voltage potential of the second group of the cells. In yet another approach, a connection of an electrical load in series with the first group of cells and the second group of cells may be alternated using pulse width modulation, such that the voltage imbalance is electrically reduced by increasing the voltage potential of the first group of the cells and by reducing the voltage potential of the second group of the cells.

In some examples, a method may also include disconnecting the first group of cells from the cells of a second one of the parallel strings, e.g., to electrically separate the first and second group of cells from each other.

Some example methods may include supplying power to the vehicle after reconnecting the parallel strings in the electrical circuit in parallel to each other.

Example methods may also include connecting the battery cells of the at least two parallel strings in a series circuit, and charging the battery cells while they are connected in the series circuit.

In another example method, a method of charging a vehicle battery pack having a plurality of parallel strings may include connecting the battery cells of at least two of the parallel strings in a series circuit and charging the battery cells while they are connected in the series circuit. In these examples, a method may further include determining a voltage imbalance between at least two of the parallel strings exceeds a threshold magnitude after charging the battery cells and, in response to that determination, electrically reducing the voltage imbalance between the at least two parallel strings using a series circuit including a first group of one or more of the battery cells of a first one of the parallel strings. These example methods may also include reconnecting the parallel strings in an electrical circuit in parallel to each other, the parallel strings thereby configured to supply power to the vehicle.

In some examples of such methods, a step of determining that the first group of the cells has a lower voltage potential than a second group of one or more of the cells of a second one of the parallel strings may also be included. Voltage imbalances between parallel strings may be electrically reduced in the exemplary ways discussed above, e.g., by (a) connecting the first group of the cells in series with an external power supply, such that the voltage imbalance is electrically reduced by increasing the voltage potential of the first group of the cells, (b) connecting the second group of the cells in series with an electrical load, such that the voltage imbalance is electrically reduced by reducing the voltage potential of the second group of the cells, and/or (c) connecting an electrical load in series with the first group of cells and the second group of cells using an alternating pulse width modulation approach, such that the voltage imbalance is electrically reduced by increasing the voltage potential of the first group of the cells and by reducing the voltage potential of the second group of the cells. In some examples, the first group of cells may be disconnected, i.e., electrically, from the cells of a second one of the parallel strings. Optionally, these methods may include supplying power to the vehicle after reconnecting the parallel strings in the electrical circuit in parallel to each other.

In yet another example of a method, a vehicle battery pack having a plurality of parallel strings may be reconfigured in a method that includes connecting the battery cells of at least two of the parallel strings in a series circuit for charging the vehicle battery pack. This example method may include determining that a voltage imbalance between at least two of the parallel strings exceeds a threshold magnitude and, in response to that determination, electrically reducing the voltage imbalance between the at least two parallel strings using a series circuit including a first group of one or more of the battery cells of a first one of the parallel strings. This example method may further include reconnecting the parallel strings in an electrical circuit in parallel to each other, the parallel strings thereby configured to supply power to the vehicle.

In some examples of such methods, a step of determining that the first group of the cells has a lower voltage potential than a second group of one or more of the cells of a second one of the parallel strings may also be included. Voltage imbalances between parallel strings may be electrically reduced in any one or more of the example approaches mentioned above, e.g., by (a) connecting the first group of the cells in series with an external power supply, such that the voltage imbalance is electrically reduced by increasing the voltage potential of the first group of the cells, (b) connecting the second group of the cells in series with an electrical load, such that the voltage imbalance is electrically reduced by reducing the voltage potential of the second group of the cells, and/or (c) connecting an electrical load in series with the first group of cells and the second group of cells using an alternating pulse width modulation approach, such that the voltage imbalance is electrically reduced by increasing the voltage potential of the first group of the cells and by reducing the voltage potential of the second group of the cells.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

Exemplary methods and systems are provided herein for a vehicle having one or more reconfigurable battery packs that are configured to provide electrical power, e.g., to a motor-generator used for propulsion of the vehicle. Example vehicles may be a battery electric vehicle (BEV) relying exclusively upon the battery pack(s) to supply power for propulsion of the vehicle. The benefits of reconfiguration for fast charging is in general greatest for larger potential battery packs typical of electric-only configurations such as BEVs since these types of powertrain do not have an alternative propulsion capability, however the methodology can be applied to any vehicle relying at least in part upon battery pack(s) for propulsion, e.g., plugin hybrid electric (PHEV) or extended range electric vehicle (EREV) configurations. Thus, some example vehicles may have an internal combustion engine providing power for propulsion of the vehicle, either alternatively or in addition to the power supplied by the battery pack(s).

Example battery packs may have a plurality of strings, with each string having a relatively large number (e.g., 100) of battery cells connected in series within the string. Battery packs may be rechargeable as a unit with the strings in a parallel circuit configuration with respect to each other. The battery packs may each be reconfigurable so that one or more of the strings of the pack can be placed in a series configuration. For example, during charging one or more strings may be placed in a series configuration together to permit a higher charging voltage to be used, thereby resulting in a higher current flowing to each cell within the strings and reducing overall charging times associated with the battery pack compared with the parallel string configuration. Merely by way of example, initially a battery pack may have two strings in parallel with each other, with each string having 100 battery cells. After reconfiguration of the strings in series for charging, the two strings are essentially charged as a single string of 200 cells as a result of the series configuration. Accordingly, the methodologies herein with respect to balancing electrical potential of strings within a battery pack generally work upon each string as a unit.

Figure 1A:
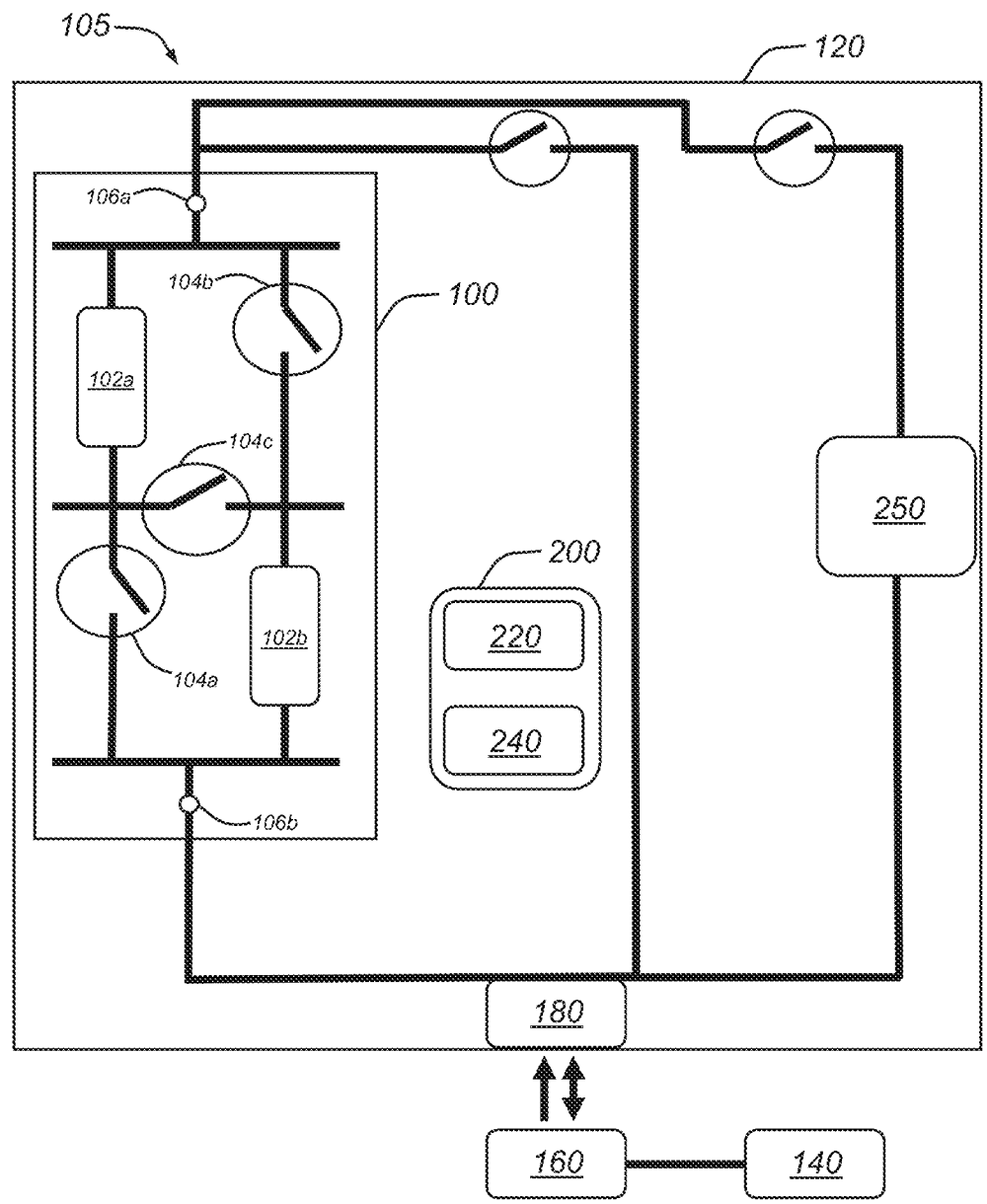
FIG. 1A is a schematic diagram depicting an example of a system for recharging a vehicle having a battery pack.

Turning now to FIG. 1A, an example system 105 is schematically illustrated. The system 105 may generally facilitate flexible direct current (DC) fast charging of an electrified vehicle 120. The electrified vehicle may include a battery pack or reconfigurable energy storage system 100, which supplies electrical power to a vehicle drivetrain 250 to provide propulsion for the vehicle 120. In one example, the vehicle 120 may be a plug-in electric vehicle, with the drivetrain 250 including an electric motor-generator that provides propulsion for the vehicle 120. A motor-generator of the drivetrain 250 may also generate electrical power that is stored in the reconfigurable energy storage system 100. In another example, the vehicle 120 may be a hybrid vehicle, i.e., where the drivetrain 250 additionally includes an internal combustion engine, which is utilized in combination with the electric motor-generator for vehicle propulsion.

By employing the apparatus 105, the charging time of the electrified vehicle 120 can be minimized when connected to a high power direct current (DC) fast charging station 140. Moreover, as will be described further below, the reconfigurable energy storage system 100 may generally allow for reconfiguration of components therein, thereby facilitating fast charging and enhancing performance of the reconfigurable energy storage system 100.

The voltage of the high-power DC fast charging station 140 may be 800 volts, merely as one example. The charging station 140 is configured to charge the vehicle 120 by way of a charge port 160. In one example, the charge port 160 is capable of supplying a DC voltage, an alternating current (AC) voltage, or both.

The vehicle 120 may include a charge receptacle 180 configured to receive the charge port 160 to electrically charge the electrified vehicle 120. The charge receptacle 180 can therefore receive AC voltage and/or DC voltage. In addition, the charge receptacle 180 may be configured to communicate with the charge station 140 through the charge port 160. As such, the charge receptacle 180 may receive and send communication and port verification signals from the charge port 160. The reconfigurable energy storage system 100 of the vehicle 120 may be selectively and electrically connected to the charge receptacle 180, thereby facilitating charging/re-charging of the reconfigurable energy storage system 100.

The electrified vehicle 120 may also include a vehicle charging controller 200. The controller 200 may be configured establish a wireless and/or wired communication link with the charging station 140, e.g., by way of a communication network (such as CAN, WAN, Blue-Tooth, Wi-Fi) of the vehicle 120. As a result, the vehicle charging controller 200 can communicate wirelessly and/or via wire with the vehicle charging station 140. The electrified vehicle 120 may be configured to determine a location of the vehicle 120 and/or the charging station 140, e.g., by way of Global Positioning System (GPS) satellite(s). The vehicle 120 may thus determine the location of the electrified vehicle 120 with respect to the charging station 140.

The vehicle charging controller 200 may include a processor 220 and a non-transitory memory 240 in communication with the processor 220. The non-transitory memory 240 can store instructions that can be executed by the processor 220. The vehicle charging controller 200 may be programmed to determine the charging voltage of the charging station 140 based on a communication signal received from the charging station 140. This communication signal may be indicative of the charging voltage of the charging station 140. The charging voltage may be, for example, a low voltage (e.g., 400 volts) or a high voltage (e.g., 800 volts). The vehicle charging controller 200 may also send current requests to the charging station 140 to electrically charge the electrified vehicle 120.

Figure 1B:
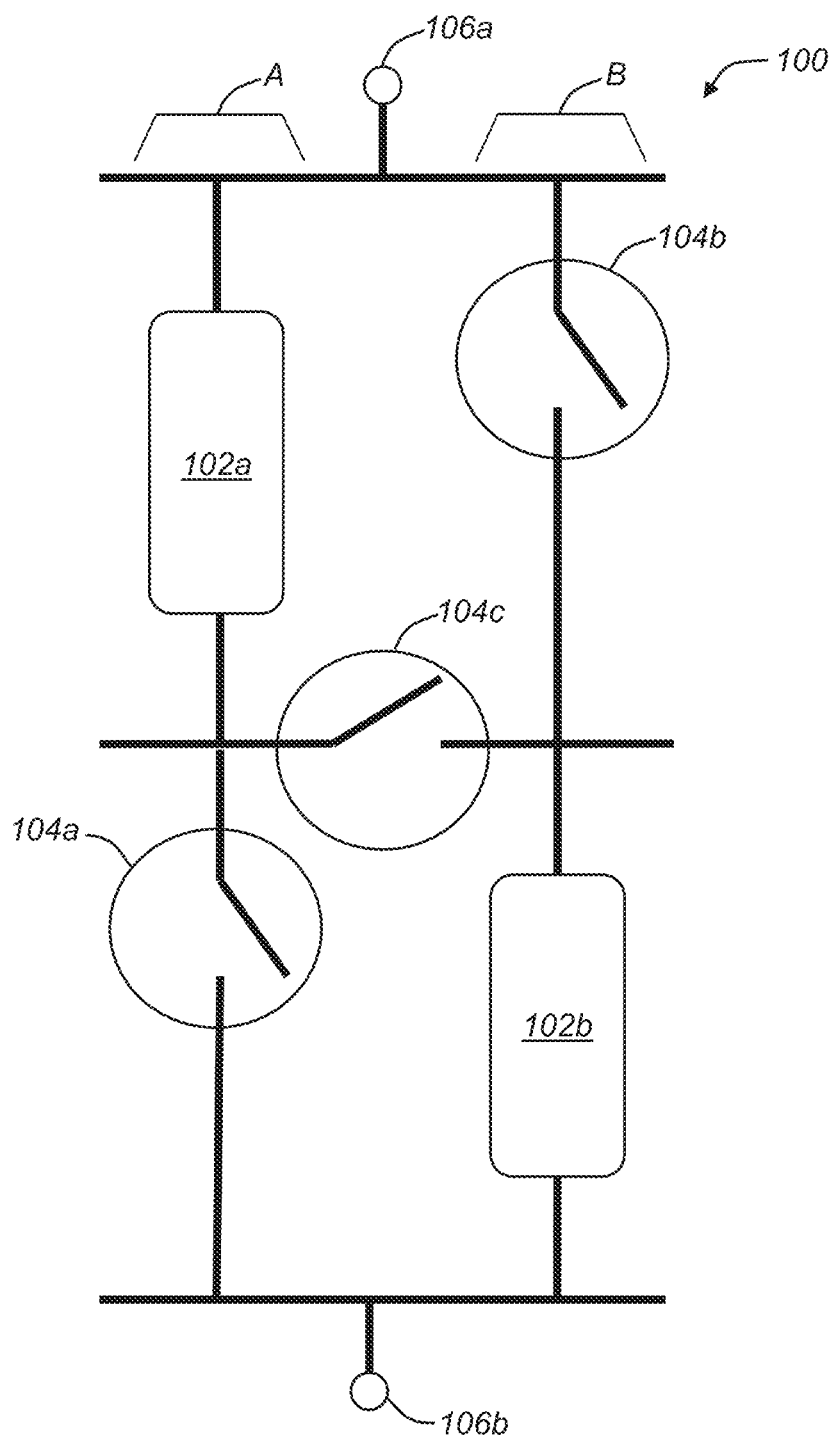
FIG. 1B is a schematic diagram depicting an embodiment of a reconfigurable battery pack for the vehicle of FIG. 1A, according to one example approach.

As best seen in FIG. 1B, the reconfigurable energy storage system 100 may include a plurality of energy storage devices 102a, 102b (collectively, 102). As shown in FIG. 1B, two rechargeable energy storage devices may be present, i.e., as a first rechargeable energy storage device 102a and a second rechargeable energy storage device 102b. However, any number of energy storage devices 102 may be employed, and in some cases a very large number of rechargeable energy storage devices 102 may be present. Accordingly, there is no limitation on the particular number of rechargeable energy storage devices 102 that may be utilized in connection with the example illustrations herein. In the present disclosure, the term "rechargeable energy storage device" refers to devices that are rechargeable and capable of storing electrical energy, such as ultra-capacitors, batteries, battery packs, battery cells, or any combination thereof. Moreover, the rechargeable energy storage devices 102 may themselves include any number of storage devices themselves, such as battery cells. In at least some examples, each of the rechargeable energy storage devices 102 include a relatively large number of battery cells, e.g., 100 or more battery cells.

Each of the first and second rechargeable energy storage devices 102a, 102b may be selectively and electrically connected to the charge receptacle 180 (see FIG. 1A) to facilitate charging and recharging of the rechargeable energy storage devices 102. For example, the reconfigurable energy storage system 100 may include a plurality of switching devices 104a, 104b, and 104c (collectively, 104) that are configured to selectively connect one or both of the rechargeable energy storage devices 102 with the charge receptacle 180. Moreover, the switches 104 may allow for the rechargeable energy storage devices 102 to be arranged in a series electrical circuit or in a parallel electrical circuit, as will be discussed further below. Each of the switching devices 104 may be in communication with the vehicle charging controller 200, such that the vehicle charging controller 200 can control the on/off operation of the switching devices 104.

The switching devices 104 may be any switching device that is convenient for selectively breaking an electrical circuit. In one example, the switches 104 are low-loss switching devices. In the present disclosure, the term "low-loss switching device" includes a solid state relay and/or an electromechanical relay. A solid state relay generally has no moving parts but instead uses electrical and optical properties of solid state semiconductors to perform its input to output isolation and switching functions. As non-limiting examples, solid state relays include MOS-controlled Thyristors (MCTs), gallium-nitride (GaN) field-effect transistors (FETs), metal-oxide-semiconductor field-effect transistors (MOSFETs), silicon carbide junction field-effect transistors (SiC JFETs), insulated-gate bipolar transistors (IGBTs) or any other suitable low loss device of suitable voltage and current ratings. The low-loss switching devices 104 may be electromechanical relays in parallel with solid state switches to further reduce the on-state conduction loses. During operation, the solid-state switches carry the current during switching from on-to-off or off-to-on state of the electromechanical relay to eliminate arcing. The term "low-loss switching device" does not include strictly mechanical switches, because in such examples it may be desirable to minimize the risk of the mechanical contacts from welding together. The low-loss switching devices 104 may be optimized for low voltage drop and to generally eliminate arcing during switching. The vehicle charging controller 200 may be programmed to selectively actuate the plurality of low-loss switching devices 104 to selectively connect the rechargeable energy storage devices 102a, 102b in series or parallel electrical circuits, as will be discussed further below.

In the example illustrated in FIG. 1B, the first rechargeable energy storage device 102a is in a first string A of the system 100, with the switching device 104a. The first string A extends between two nodes 106a, 106b of the system 100. The second rechargeable energy storage device 102b is in a second string B of the system 100, with the switching device 104b, which also extends between the same two nodes 106a, 106b. The switching device 104c is disposed between the two "parallel" strings A and B. In this arrangement, the parallel strings A and B may be placed in a series circuit by opening both of the switching devices 104a and 104b and closing the switching device 104c, such that an electrical load or supply connected to the nodes 106a, 106b would be conducted through the two rechargeable energy storage devices 102a, 102b in series. Alternatively, the parallel strings A and B may be placed in a parallel circuit between the two nodes 106a, 106b by opening the switching device 104c and closing each of the switching devices 104a and 104b, such that an electrical load or supply connected to the nodes 106a, 106b is conducted through the rechargeable energy storage devices 102a and 102b in parallel.

As will be discussed further below, in some situations it may be desirable to connect the strings A and B in parallel, e.g., when the rechargeable energy storage devices 102a and 102b are supplying power to the vehicle drivetrain 250. In other situations, e.g., when the rechargeable energy storage devices 102 are to be recharged, it may be convenient to connect the parallel strings A and B in series, as this may facilitate faster charging of the rechargeable energy storage devices 102.

An imbalance in electrical potential, e.g., measured in Volts (V), may occur after the rechargeable energy storage devices 102 are recharged in series. Such imbalances may be particularly prevalent where the rechargeable energy storage devices 102 have a relatively low impedance or are otherwise designed for relatively quick charging. An imbalance may occur, for example, due to differences in the rechargeable energy storage devices 102 themselves or conditions affecting how quickly each of the rechargeable energy storage devices 102 may be recharged relative to each other. Where these imbalances are significant, they may affect compatibility of the parallel strings A and B to be placed in a parallel electrical circuit. On the other hand, relatively small voltage imbalances will generally not be problematic to placing the parallel strings A and B in a parallel circuit. Merely by way of example, where a voltage imbalance is less than one percent of the electrical potential of the rechargeable energy storage devices 102, such an imbalance may not need to be corrected in order to place the rechargeable energy storage devices 102 in a parallel circuit. In another example, if a voltage imbalance is less than 1 V, the rechargeable energy storage devices 102 may be placed into a parallel electrical circuit.

Where an imbalance in electrical potential between the strings A and B (i.e., between their associated rechargeable energy storage devices 102a and 102b) is significant, it may be desirable to electrically reduce the imbalance. An imbalance in electrical potential may be reduced in any of the example methods discussed in further detail below.

Turning now to FIGS. 2A-2D, the example system 100 is illustrated in connection with one example approach for electrically reducing a voltage imbalance. Initially, in FIG. 2A, the strings A and B are in a series electrical circuit, with a power supply 108 charging each of the rechargeable energy storage devices 102a and 102b in series. The power supply 108 may include any device/system for recharging the rechargeable energy storage devices 102, and may be onboard and installed to the vehicle 120 (e.g., where a motor-generator unit of the drivetrain 250 supplies electrical power during coasting, or the like) or offboard the vehicle 120 (e.g., where the vehicle 120 is receiving power from charging station 140).

Figure 2A:
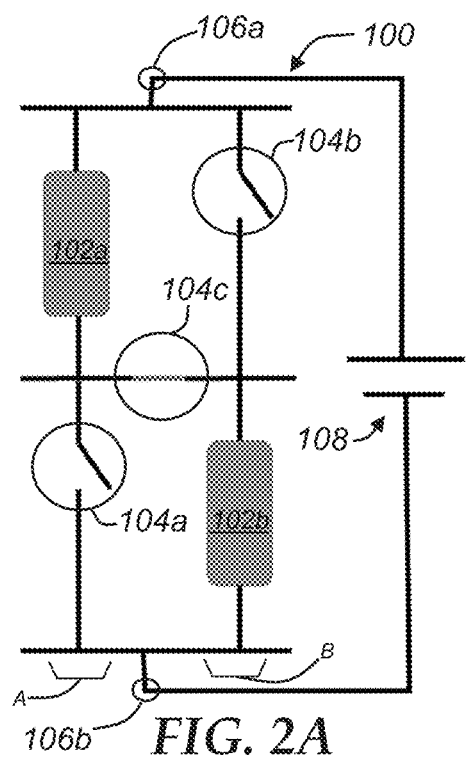
FIG. 2A is a schematic diagram of the reconfigurable battery pack of FIG. 1, with two battery cells connected in a series circuit.
Figure 2B:
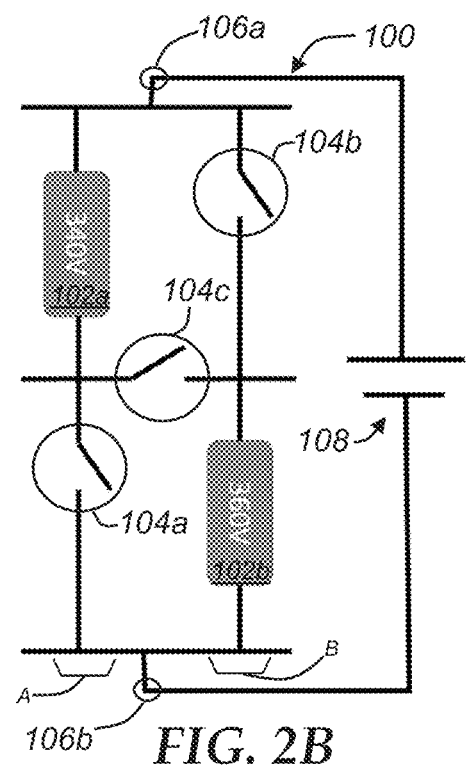
FIG. 2B is a schematic diagram of the reconfigurable battery pack of FIG. 1, with two battery cells shown having a voltage imbalance.

Turning to FIG. 2B, the rechargeable energy storage devices 102a and 102b are shown having different electrical potentials after charging the rechargeable energy storage devices 102a and 102b in series, creating a voltage imbalance between the parallel strings A and B. For example, as shown in FIG. 2B, rechargeable energy storage device 102a may have a lower voltage potential (340 V) than the rechargeable energy storage device 102b (360 V). The imbalance of 20 V is merely one example, as any threshold may be used that is convenient for determining whether the voltage imbalance should be reduced prior to placing the parallel strings A and B into a parallel circuit.

Figure 2C:
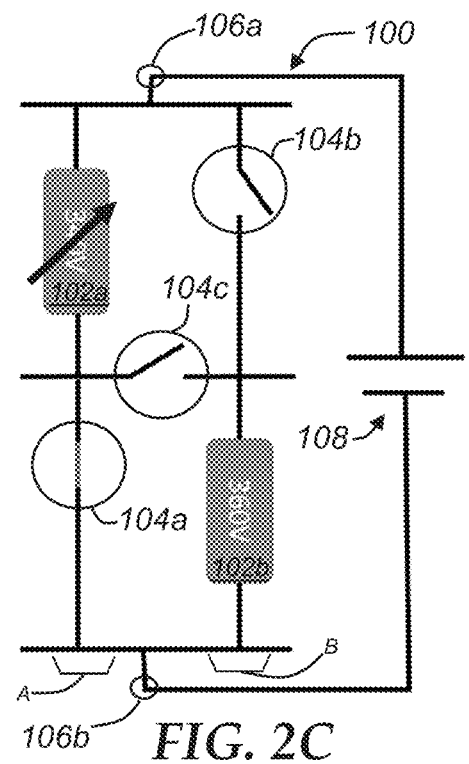
FIG. 2C is a schematic diagram of the reconfigurable battery pack of FIG. 1, with one battery cell being recharged in series, while another battery cell is disconnected.
Figure 2D:
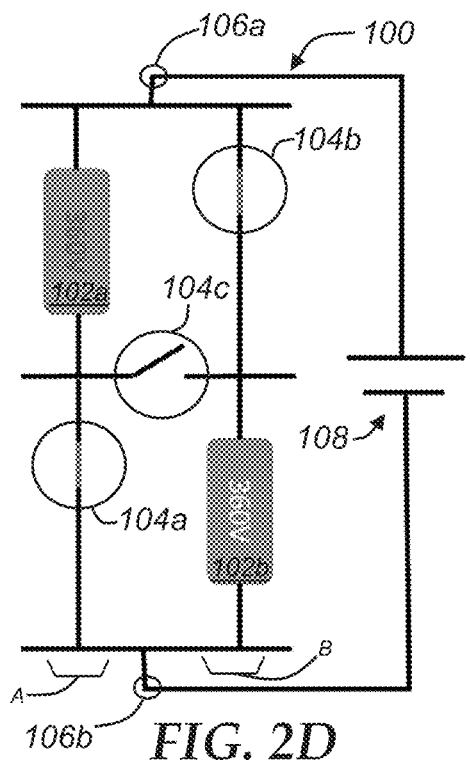
FIG. 2D is a schematic diagram of the reconfigurable battery pack of FIG. 1, with two battery cells being connected in a parallel circuit.

To electrically reduce the voltage imbalance between the parallel strings A and B of the system 100, as shown in FIG. 2C the switching devices 104b and 104c may be opened, and the switching device 104a closed. Accordingly, the power supply 108 may charge the rechargeable energy storage device 102a, increasing its electrical potential. Turning now to FIG. 2D, upon sufficient charging the rechargeable energy storage device 102a has reached the same electrical potential (360 V) as the rechargeable energy storage device 102b. While the imbalance in electrical potential is substantially zero in this example, in other approaches the imbalance may be reduced to within the applicable threshold (i.e., that used to initially determine the existence of an imbalance in voltage). The rechargeable energy storage devices 102a and 102b may then be placed into a parallel circuit, e.g., for supplying power to the drivetrain 250 of the vehicle 120, by closing switching devices 104a and 104b and opening switching device 104c.

Figure 3C:
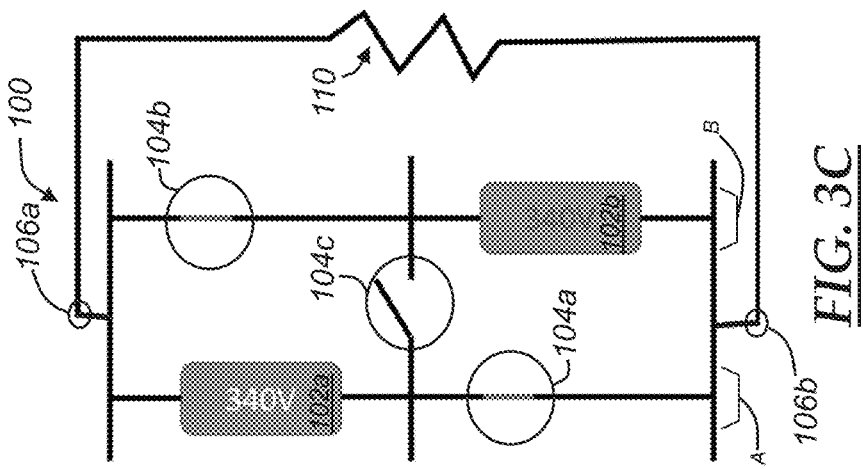
FIG. 3C is a schematic diagram of the reconfigurable battery pack of FIG. 1, with two battery cells being connected in a parallel circuit.
Figure 3B:
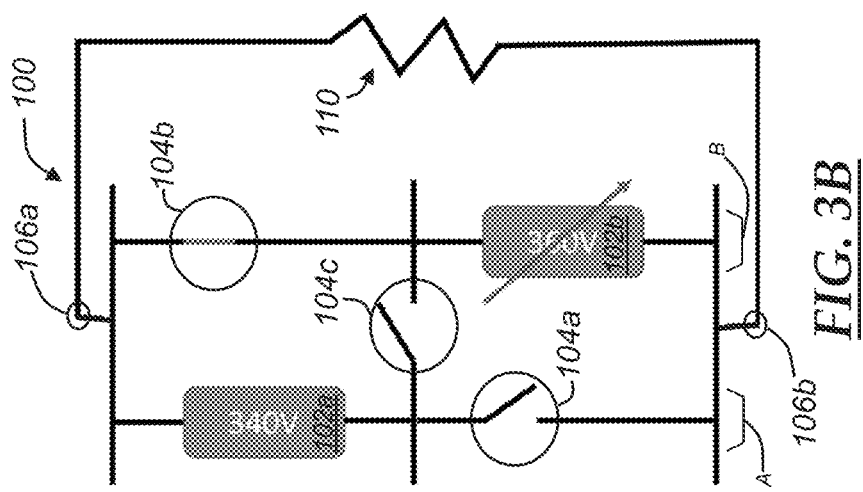
FIG. 3B is a schematic diagram of the reconfigurable battery pack of FIG. 1, with one battery cell being connected in series with an electrical load, while another battery cell is disconnected.
Figure 3A:
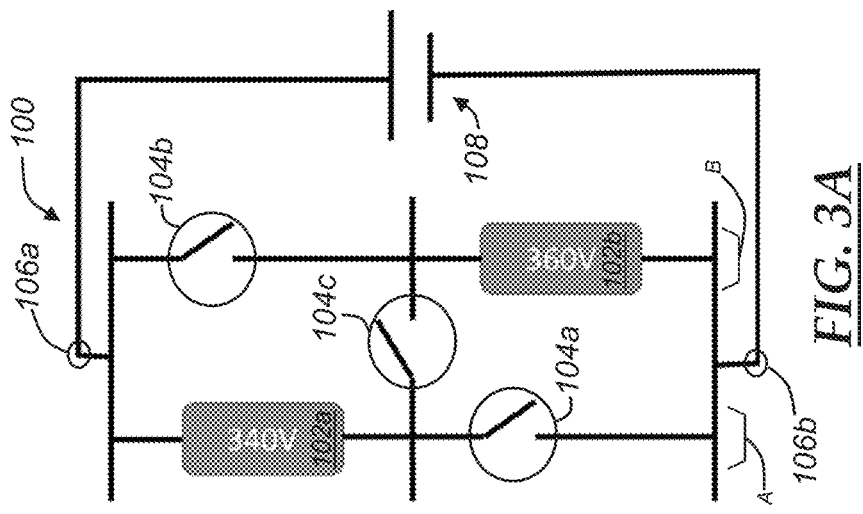
FIG. 3A is a schematic diagram of the reconfigurable battery pack of FIG. 1, with two battery cells shown having a voltage imbalance.

Turning now to FIGS. 3A-3C, another example methodology for reducing a voltage imbalance between rechargeable energy storage devices 102a and 102b is illustrated in further detail. In FIG. 3A, the rechargeable energy storage devices 102a and 102b are shown having different electrical potentials after charging the rechargeable energy storage devices 102a and 102b in series, creating a voltage imbalance between the parallel strings A and B. In the example illustrated in FIG. 3A, rechargeable energy storage device 102a may have a lower voltage potential (340 V) than the rechargeable energy storage device 102b (360 V). As with the example discussed above in FIGS. 2A-2D, the voltage imbalance of 20 V illustrated in FIG. 3A is merely an example, and any threshold may be used that is convenient for determining whether the voltage imbalance should be reduced prior to placing the parallel strings A and B into a parallel circuit.

To electrically reduce the voltage imbalance between the parallel strings A and B of the system 100, an electrical load may be used to reduce the voltage potential of the higher potential rechargeable energy storage device 102b. More specifically, as shown in FIG. 3B, the switching devices 104a and 104c may be opened, and the switching device 104b closed. An electrical load 110 may be connected with the nodes 106a, 106b, thereby drawing current from the rechargeable energy storage device 102b and reducing its electrical potential. Turning now to FIG. 3C, the current draw from the rechargeable energy storage device 102b eventually reduces its electrical potential to that of the rechargeable energy storage device 102b. As with the example in FIG. 2D, while the imbalance in electrical potential shown in the example of FIG. 3C is substantially zero, in other approaches the imbalance may be reduced to within the applicable threshold (i.e., that used to initially determine the existence of an imbalance in voltage). The rechargeable energy storage devices 102a and 102b may then be placed into a parallel circuit, e.g., for supplying power to the drivetrain 250 of the vehicle 120, by closing switching devices 104a and 104b and opening switching device 104c.

Figure 4C:
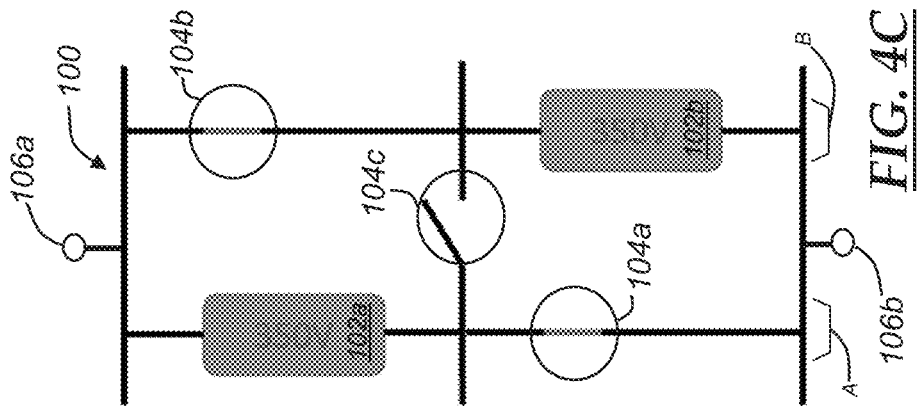
FIG. 4C is a schematic diagram of the reconfigurable battery pack of FIG. 1, with two battery cells being connected in a parallel circuit.
Figure 4B:
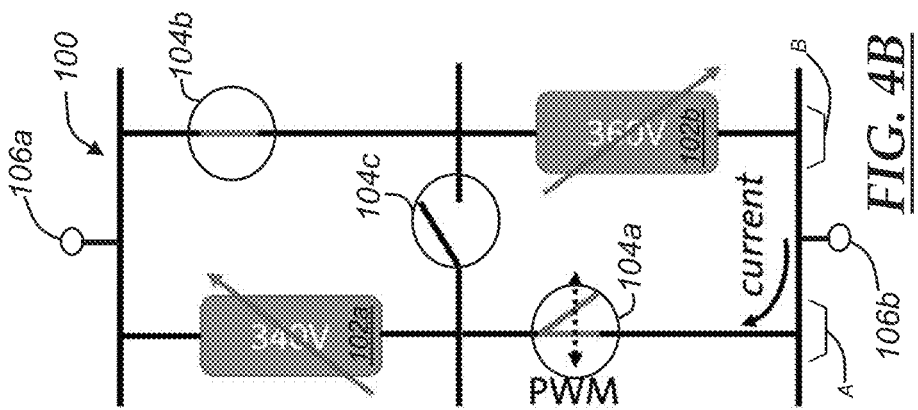
FIG. 4B is a schematic diagram of the reconfigurable battery pack of FIG. 1, with two battery cells being alternated between a disconnected state and a parallel circuit connection.
Figure 4A:
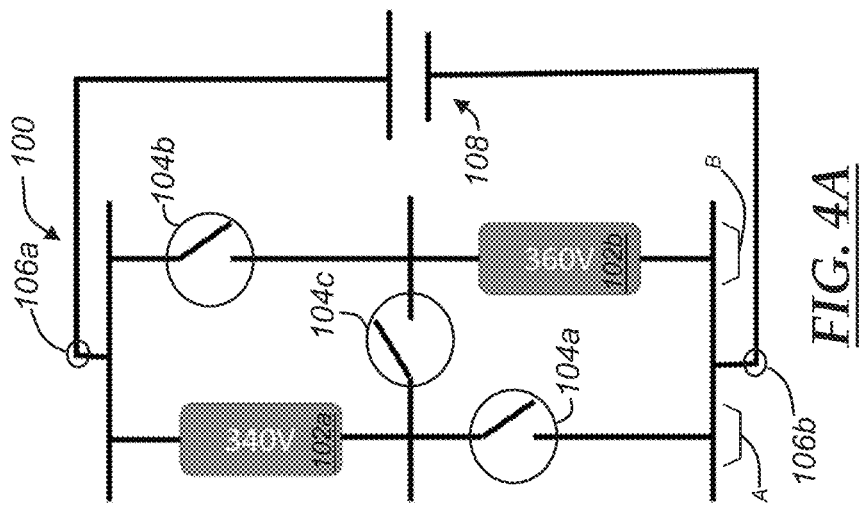
FIG. 4A is a schematic diagram of the reconfigurable battery pack of FIG. 1, with two battery cells shown having a voltage imbalance.

Turning now to FIGS. 4A-4C, another example methodology for reducing a voltage imbalance between rechargeable energy storage devices 102a and 102b is illustrated in further detail. In FIG. 4A, the rechargeable energy storage devices 102a and 102b are shown having different electrical potentials after charging the rechargeable energy storage devices 102a and 102b in series, creating a voltage imbalance between the parallel strings A and B. In the example illustrated in FIG. 4A (as with the examples shown in FIGS. 2B and 3A), the rechargeable energy storage device 102a has a lower voltage potential (340 V) than the rechargeable energy storage device 102b (360 V). As with the preceding examples discussed above, the voltage imbalance of 20 V illustrated in FIG. 4A is merely one example, and any threshold may be used that is convenient.

In the example of FIGS. 4A-4C, a pulse width modulation (PWM) method is employed to electrically reduce the voltage imbalance between the parallel strings A and B of the system 100. More specifically, in FIG. 4B, the switching device 104c is opened, and the switching device 104b is closed. The switching device 104a may be alternated between an opened and closed position, the result being a current draw through the series circuit including both rechargeable energy storage devices 102, which increases the electrical potential of the rechargeable energy storage device 102a while reducing the electrical potential of the rechargeable energy storage device 102b.

Turning now to FIG. 4C, the PWM effect eventually reduces the voltage imbalance between the rechargeable energy storage devices 102a and 102b. As with the examples above, while the imbalance in electrical potential shown in the example of FIG. 4C is substantially zero (with each of the rechargeable energy storage devices 102 eventually reaching an electrical potential of 350 V), in other approaches the imbalance between the rechargeable energy storage devices 102 may merely be reduced to a non-zero amount that is within the applicable threshold. The rechargeable energy storage devices 102a and 102b may then be placed into a parallel circuit, e.g., for supplying power to the drivetrain 250 of the vehicle 120, by closing switching devices 104a and 104b and opening switching device 104c.

In the context of the examples provided above in FIGS. 4A-4C, which rely upon a PWM method to electrically reduce an imbalance in electrical potential, it may be useful for the switching device 104a and/or 104b to have some impedance themselves, or an additional electrical load (not shown) that is included in the circuit with the rechargeable energy storage devices 102a and 102b, in order to avoid overcurrent. This may be particularly so where the rechargeable energy storage devices 102 are designed for relatively quick charging or otherwise have a low impedance.

The three different example methods described above for reducing an imbalance in electrical potential may be useful in different situations or applications in connection with the vehicle 120 and/or system 105. For example, where a vehicle 120 is being recharged via charging station 140 or an electric motor-generator included in the powertrain 250 is otherwise not in use, it may be useful to address a voltage imbalance by charging the lower potential string (thereby increasing the electrical potential relative to the higher potential string), e.g., with a power supply 108 as described in FIGS. 2A-2D. Alternatively, where an external charging source such as charging station 140 is not available and there is an immediate need for electrical power from the system 100 (e.g., the vehicle 120 is in use), an imbalance in electrical potential may be addressed by drawing down the higher potential string using a motor-generator of the powertrain 250, consistent with the example discussed in FIGS. 3A-3C. In another example, where an external charging source such as charging station 140 is not available but the vehicle 120 is not in use or there otherwise is not a need for electrical power from the system 100, an imbalance in electrical potential may be reduced using the example PWM method illustrated in FIGS. 4A-4C.

As mentioned above, while two rechargeable energy storage devices 102a and 102b are illustrated in connection with each of the example methods for electrically reducing an imbalance in electrical potential, the example methods may be applied to any number of rechargeable energy storage devices 102 in a given system 100. Merely by way of example, where a system 100 includes more than two strings or separate rechargeable energy storage devices 102, and different corresponding electrical potentials (e.g., a first string has 320 V, a second string has 340 V, and a third string has 360 V), the imbalance in potential may be addressed with respect to each string in sequence.

For example, the voltage imbalance may be addressed by electrically reducing the imbalance between the two highest priority strings with the external power supply 108 (in this example, by increasing the potential of the 320 V string to match that of the 340 V string), and subsequently connecting those two strings in parallel with each other. The two parallel strings may then be charged together in parallel to reduce the voltage imbalance between those two strings and the third string, such that all three strings have a 360 V potential.

In an alternative approach for the three-string example using the electrical load method, the voltage imbalance may be addressed by electrically reducing the imbalance between the two highest priority strings using the electrical load 110. More specifically, the electrical load 110 may be applied to the 360 V string alone (i.e., in series), such that the 360 V potential of the third string is reduced to match that of the 340 V string. Next, the two strings then having a 340 V potential may be connected in parallel with each other, and the electrical load 110 used to reduce their potential further to match the potential of the 320 V string, such that all three strings then have a 320 V potential.

In another approach for the three-string example using the PWM method, the voltage imbalance may be addressed by electrically reducing the imbalance between the two highest priority strings by initially connecting the two higher strings together in series, and alternating a switching device 104 in series with the two higher strings between open and closed states to reduce their potential to 350V each. Next, the two strings then having a 350 V potential may be connected in parallel with each other, and in series with the remaining 320 V string and a switching device 104. The switching device 104 may be opened/closed to further reduce the potential of the higher two strings, and raise the potential of the lower string, until the imbalance in electrical potential is reduced below the applicable threshold or eliminated.

Figure 5:
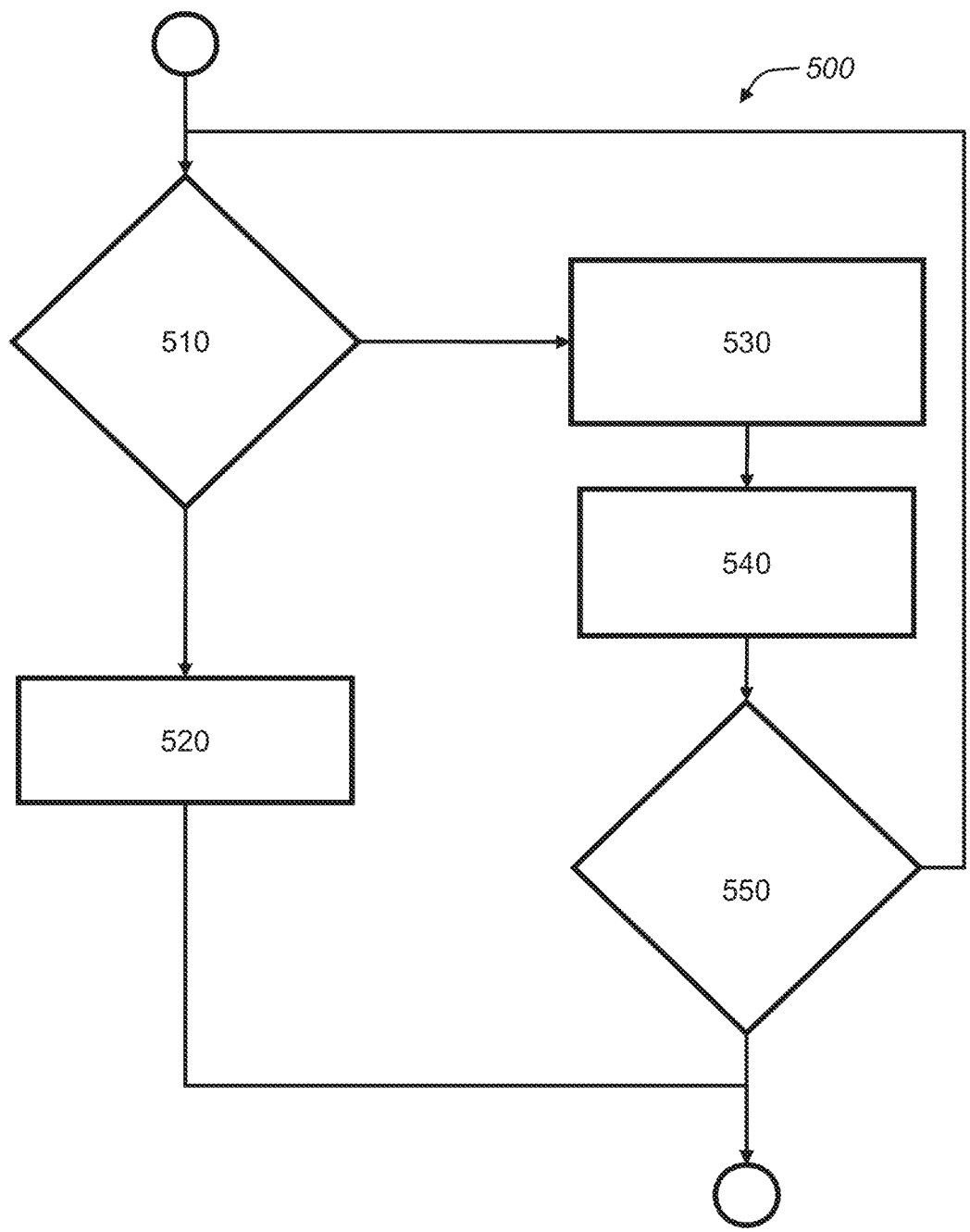
FIG. 5 is an example process flow diagram, illustrating example methods for use in connection with a reconfigurable battery pack.

Turning now to FIG. 5, an example process 500 is disclosed for electrically reducing an imbalance in electrical potential between two rechargeable energy storage devices, e.g., rechargeable energy storage devices 102. Process 500 may be applied to an y number of strings within a given system 100 that includes the rechargeable energy storage devices 102.

Beginning at block 510, process 500 may query whether there is a voltage imbalance between any of the strings present in system 100 that exceeds the applicable threshold. Process 500 may determine, for example, that a first string or grouping of cells in a string has a lower voltage potential than a second group of one or more of the cells of a second one of the parallel strings. In some examples, this query may output a positive result where there is an imbalance of at least 1% of the electrical potential of one or more of the parallel strings A and B of system 100. In another example, this query may output a positive result where there is an imbalance of at least 1 V between two of the parallel strings A and B of system 100. Any other threshold may be employed that is convenient.

Where block 510 determines that there is no imbalance in electrical potential exceeding an applicable threshold, process 500 may proceed to block 520, where the parallel strings (e.g., strings A and B of system 100) may be connected in parallel (e.g., with respect to the nodes 106a, 106b). Accordingly, the system 100 may supply electrical power by way of the parallel strings A and B, e.g., to the powertrain 250 of vehicle 120.

Alternatively, where there is an imbalance between at least two parallel strings of a system 100, process 500 may proceed to block 530.

At block 530, in response to the determination at block 510, process 500 may electrically reduce the voltage imbalance between two parallel strings using a series circuit including a first group of one or more of the battery cells of a first one of the parallel strings. In some examples, the first string or group of cells may be disconnected from the other string or group of cells, e.g., where the two strings A and B were previously in a series circuit together for charging.

For example, as noted above in connection with the examples discussed in FIGS. 2A-2D, one of the rechargeable energy storage devices 102a may be placed into a series circuit with a power supply 108 to increase the electrical potential of the rechargeable energy storage device 102a to electrically reduce a voltage imbalance with respect to another rechargeable energy storage device 102b. In other words, the voltage imbalance of the first group of cells or rechargeable energy storage device 102a is addressed by increasing the voltage potential of the first group of the cells using the power supply 108.

Alternatively, a voltage imbalance between strings of a battery pack may be addressed by connecting the higher-potential group of the cells in series with an electrical load, such that the voltage imbalance is electrically reduced by reducing the voltage potential of the second group of the cells. For example, as discussed above in connection with the examples of FIGS. 3A-3C, an electrical load 110, e.g., a motor-generator of the powertrain 250 of vehicle 120, may be driven by a higher-potential string or group of cells of a battery pack. In the example of FIGS. 3A-3C, the higher-potential string B including the rechargeable energy storage device 102b may be placed in series with the electrical load 110, thereby reducing the electrical potential of the rechargeable energy storage device 102b relative to the rechargeable energy storage device 102a.

In another alternative method for reducing a voltage or potential imbalance, a connection of an electrical load in series with the first group of cells and the second group of cells is connected in a pulse width modulation process, such that the voltage imbalance is electrically reduced by increasing the voltage potential of the first group of the cells and by reducing the voltage potential of the second group of the cells. For example, as discussed above in FIGS. 4A-4C, a switching device 104a may be alternated (in some cases rapidly) between closed and open positions, thereby connecting and breaking a series circuit that includes both of the groups of cells having the voltage imbalance (i.e., the rechargeable energy storage devices 102a and 102b).

As part of block 530, process 500 may determine which of the various methods described herein may be employed to reduce an imbalance in electrical potential. As noted above, where a vehicle 120 is connected with an external source of electrical power, e.g., power supply 108 or charging station 140, it may be convenient to take advantage of the availability of additional electrical power and electrically reduce an electrical potential imbalance by increasing the potential of the lowest-potential string by connecting that string in series with the power supply. If the vehicle 120 is in use creating a need to supply electrical power to a motor-generator of the powertrain 250, and another power source is not available, an imbalance may be addressed by temporarily using a higher potential string(s) of a battery pack until the voltage imbalance relative to other string(s) is reduced or eliminated. Lastly, if the vehicle is not in use and no additional power supply, e.g., power supply 108 or charging station 140 is available, a higher-potential string and a lower-potential string within a battery pack may be connected in series with an electrical load (provided by way of a switching device 104 or as an external load connected in series with the two strings) in an alternating PWM method, thereby reducing the electrical potential imbalance between the strings.

As a result of the step(s) that may be taken as described above in block 530, a voltage imbalance between two strings of a battery pack may be eliminated or substantially eliminated. Alternatively, a voltage imbalance may be reduced within an applicable threshold used to determine the presence of a voltage imbalance between strings of a battery pack. Upon sufficient reduction or elimination of the voltage imbalance between the two strings being addressed at block 530, process 500 may proceed to block 540.

At block 540, the two strings for which an imbalance in electrical potential was addressed in block 530 may be reconnected in parallel. Process 500 may then proceed to block 550.

At block 550, process 500 queries whether all of the strings of a given battery pack have been reconnected in parallel. For example, where only two strings are present in a battery pack, such as with strings A and B of the example energy storage system 100, process 500 may determine that all strings are now connected in parallel. Accordingly, the energy storage system 100 may be used to supply electrical energy for the vehicle 120, e.g., to powertrain 250 of the vehicle.

Where process 500 determines that not all strings are connected in parallel at block 550, i.e., there are remaining strings of a battery pack that are not yet connected in parallel, process 500 proceeds back to block 510. Accordingly, process 500 may then determine whether other string(s) of the battery pack have a voltage imbalance with respect to the two strings already connected in parallel, and address the imbalances as needed, i.e., at block 530. Accordingly, process 500 may be used in connection with a battery pack having any number of strings. As mentioned above, after all of the strings of the energy storage system 100 are reconnected in parallel, the battery pack may be used to supply power to the vehicle 120. Process 500 may then terminate.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

What is claimed is:

1. A method of charging a vehicle battery pack having a plurality of parallel strings, each of the parallel strings comprising one or more battery cells, comprising:

(a) determining a voltage imbalance between at least two of the parallel strings exceeds a threshold magnitude, and determining that a first group of one or more of the battery cells of a first one of the parallel strings has a lower voltage potential than a second group of one or more of the cells of a second one of the parallel strings;

(b) in response to the determination in step (a), electrically reducing the voltage imbalance between the at least two parallel strings using a series circuit including the first group of the cells, wherein electrically reducing the voltage imbalance includes:

(b1) determining whether the vehicle is connected to an external source of electrical power;

(b2) determining whether the vehicle is in use; and (b3) in response to the determinations in steps (b1) and (b2):

when the vehicle is determined to be connected to an external source of electrical power, electrically reducing the voltage imbalance by connecting the first group of the cells in series with the external power supply, such that the voltage imbalance is electrically reduced by increasing the voltage potential of the first group of the cells;

when the vehicle is determined to be in use, electrically reducing the voltage imbalance by connecting the second group of the cells in series with an electrical load of the vehicle, such that the voltage imbalance is electrically reduced by reducing the voltage potential of the second group of the cells; and when the vehicle is determined to not be connected to an external source of electrical power and also determined to not be in use, alternating a connection of an electrical load in series with the first group of cells and the second group of cells using pulse width modulation, such that the voltage imbalance is electrically reduced by increasing the voltage potential of the first group of the cells and by reducing the voltage potential of the second group of the cells; and (c) reconnecting the parallel strings in an electrical circuit in parallel to each other, the parallel strings thereby configured to supply power to the vehicle.

2. The method of claim 1, further comprising disconnecting the first group of cells from the second group of cells.

3. The method of claim 1, further comprising supplying power to the vehicle after reconnecting the parallel strings in the electrical circuit in parallel to each other.

4. The method of claim 1, further comprising connecting the battery cells of the at least two parallel strings in a series circuit, and charging the battery cells while they are connected in the series circuit.

5. A method of charging a vehicle battery pack having a plurality of parallel strings, each of the parallel strings comprising one or more battery cells, comprising:

(a) connecting the battery cells of at least two of the parallel strings in a series circuit;

(b) charging the battery cells while they are connected in the series circuit;

(c) determining a voltage imbalance between at least two of the parallel strings exceeds a threshold magnitude after charging the battery cells, and determining that a first group of one or more of the battery cells of a first one of the parallel strings has a lower voltage potential than a second group of one or more of the cells of a second one of the parallel strings;

(d) in response to the determination in step (c), electrically reducing the voltage imbalance between the at least two parallel strings using a series circuit including the first group of the cells, wherein electrically reducing the voltage imbalance includes:

(d1) determining whether the vehicle is connected to an external source of electrical power;

(d2) determining whether the vehicle is in use; and (d3) in response to the determinations in steps (d1) and (d2):

when the vehicle is determined to be connected to an external source of electrical power, electrically reducing the voltage imbalance by connecting the first group of the cells in series with the external power supply, such that the voltage imbalance is electrically reduced by increasing the voltage potential of the first group of the cells;

when the vehicle is determined to be in use, electrically reducing the voltage imbalance by connecting the second group of the cells in series with an electrical load of the vehicle, such that the voltage imbalance is electrically reduced by reducing the voltage potential of the second group of the cells; and when the vehicle is determined to not be connected to an external source of electrical power and also determined to not be in use, alternating a connection of an electrical load in series with the first group of cells and the second group of cells using pulse width modulation, such that the voltage imbalance is electrically reduced by increasing the voltage potential of the first group of the cells and by reducing the voltage potential of the second group of the cells; and (e) reconnecting the parallel strings in an electrical circuit in parallel to each other, the parallel strings thereby configured to supply power to the vehicle.

6. The method of claim 5, further comprising disconnecting the first group of cells from the second group of cells.

7. The method of claim 5, further comprising supplying power to the vehicle after reconnecting the parallel strings in the electrical circuit in parallel to each other.

8. A method of reconfiguring a vehicle battery pack having a plurality of parallel strings, each of the parallel strings comprising one or more battery cells, comprising:

(a) connecting the battery cells of at least two of the parallel strings in a series circuit for charging the vehicle battery pack;

(b) determining a voltage imbalance between at least two of the parallel strings exceeds a threshold magnitude, and determining that a first group of one or more of the battery cells of a first one of the parallel strings has a lower voltage potential than a second group of one or more of the cells of a second one of the parallel strings;

(c) in response to the determination in step (b), electrically reducing the voltage imbalance between the at least two parallel strings using a series circuit including the first group of the cells, wherein electrically reducing the voltage imbalance includes:

(c1) determining whether the vehicle is connected to an external source of electrical power;

(c2) determining whether the vehicle is in use; and (c3) in response to the determinations in steps (c1) and (c2):

when the vehicle is determined to be connected to an external source of electrical power, electrically reducing the voltage imbalance by connecting the first group of the cells in series with the external power supply, such that the voltage imbalance is electrically reduced by increasing the voltage potential of the first group of the cells;

when the vehicle is determined to be in use, electrically reducing the voltage imbalance by connecting the second group of the cells in series with an electrical load of the vehicle, such that the voltage imbalance is electrically reduced by reducing the voltage potential of the second group of the cells; and when the vehicle is determined to not be connected to an external source of electrical power and also determined to not be in use, alternating a connection of an electrical load in series with the first group of cells and the second group of cells using pulse width modulation, such that the voltage imbalance is electrically reduced by increasing the voltage potential of the first group of the cells and by reducing the voltage potential of the second group of the cells; and (d) reconnecting the parallel strings in an electrical circuit in parallel to each other, the parallel strings thereby configured to supply power to the vehicle.

9. The method of claim 8, further comprising disconnecting the first group of cells from the second group of cells.

10. The method of claim 8, further comprising supplying power to the vehicle after reconnecting the parallel strings in the electrical circuit in parallel to each other.

* * * * *